(12) United States Patent
Harchol-Balter et al.

(10) Patent No.: US 7,808,926 B2
(45) Date of Patent: *Oct. 5, 2010

(54) SYSTEM AND METHOD FOR RESOURCE DISCOVERY

(75) Inventors: Mor Harchol-Balter, Pittsburgh, PA (US); F. Thomson Leighton, Newtonville, MA (US); Daniel Lewin, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 134 days.

This patent is subject to a terminal disclaimer.

(21) Appl. No.: 11/866,180

(22) Filed: Oct. 2, 2007

(65) Prior Publication Data
US 2008/0212492 A1 Sep. 4, 2008

Related U.S. Application Data

(63) Continuation of application No. 09/576,676, filed on May 23, 2000, now Pat. No. 7,295,523.

(60) Provisional application No. 60/135,473, filed on May 24, 1999.

(51) Int. Cl.
  H04L 12/28 (2006.01)
  H04L 12/56 (2006.01)
  G06F 15/177 (2006.01)

(52) U.S. Cl. .......... 370/254; 370/400; 709/237

(58) Field of Classification Search ......... 370/254–255; 709/223–229
  See application file for complete search history.

(56) References Cited

U.S. PATENT DOCUMENTS

| | | | | |
|---|---|---|---|---|
| 4,644,532 A | * | 2/1987 | George et al. | 370/255 |
| 5,007,052 A | | 4/1991 | Flammer | |
| 5,051,987 A | | 9/1991 | Conlon et al. | |

(Continued)

OTHER PUBLICATIONS

Agrawal et al., "Epidemic Algorithms in Replicated Databases", Proceedings of the Sixteenth ACM SIGACT-SIGMOD-SIGART Symposium on Principles of Database Systems, pp. 161-172, May 12-15, 1997.

(Continued)

*Primary Examiner*—Tri H Phan
(74) *Attorney, Agent, or Firm*—Goodwin Procter LLP

(57) ABSTRACT

In distributed networks of cooperating nodes, it is useful to perform resource discovery in a manner that is efficient but that also minimizes communication complexity. A system and method in which nodes in a network efficiently are provided with information about the presence of, and other information about, other nodes in the network provides tangible benefits. In general, in one aspect, a system and method according to the invention features a distributed method for communicating information among a plurality of nodes. The method includes choosing, by a first node, one second node from information about nodes that the first node is aware of. The method further includes communicating from the first node to the second node information about the first node and nodes that the first node is aware of. The method further includes adding or merging, by the second node, the information about the first node and nodes that the first node is aware of with information about nodes that the second node is aware of. The method further includes each of the plurality of cooperating nodes repeating these steps.

20 Claims, 10 Drawing Sheets

U.S. PATENT DOCUMENTS

| | | | | |
|---|---|---|---|---|
| 5,719,868 | A | * | 2/1998 | Young .................. 370/436 |
| 5,914,939 | A | | 6/1999 | Serkowski |
| 6,041,049 | A | | 3/2000 | Brady |
| 6,167,438 | A | * | 12/2000 | Yates et al. .................. 709/216 |
| 6,192,401 | B1 | * | 2/2001 | Modiri et al. ................ 709/220 |
| 6,246,669 | B1 | * | 6/2001 | Chevalier et al. ........... 370/238 |
| 6,426,945 | B1 | * | 7/2002 | Sengodan ................... 370/238 |
| 6,820,122 | B1 | * | 11/2004 | Mandler et al. ............. 709/226 |

OTHER PUBLICATIONS

Assmann et al., "The Number of Rounds Needed to Exchange Information Within a Graph", SIAM Discrete Applied Math, vol. 6, No. 2, pp. 117-125, Jul. 1983.

Demers et al., "Epidemic Algorithms for Replicated Database Maintenance", Proceedings of the Sixth Annual ACM Symposium on Principles of Distributed Computing, pp. 1-12, Aug. 10-12, 1987.

Even et al., "On the Number of Rounds Necessary to Disseminate Information", Proceedings of the ACM Symposium on Parallel Algorithms and Architectures, pp. 318-327, 1989.

Hayden et al., "Probabilistic Broadcast", Cornell CS Technical Report TR96-1606, 15 pages, 1998.

Hedetniemi et al., "A Survey of Gossiping and Broadcasting in Communication Networks", Networks, vol. 18, No. 4, pp. 319-349, winter 1988.

Moy, "RFC 1583: OSPF Version 2", printed Oct. 25, 2000 from http://rfc.asuka.net/rfc/rfc1583.html, 213 pages, Mar. 1994.

Oppen et al., "The Clearinghouse: A Decentralized Agent for Locating Named Objects in a Distributed Environment", ACM Transactions on Office Information Systems, vol. 1, No. 3, pp. 230-253, Jul. 1983.

Pelc, "Fault-Tolerant Broadcasting and Gossiping in Communication Networks", Networks, vol. 28, pp. 143-156, Oct. 1996.

Van Renesse et al, "A Gossip-Style Failure Detection Service", pp. 55-70, 1998.

* cited by examiner

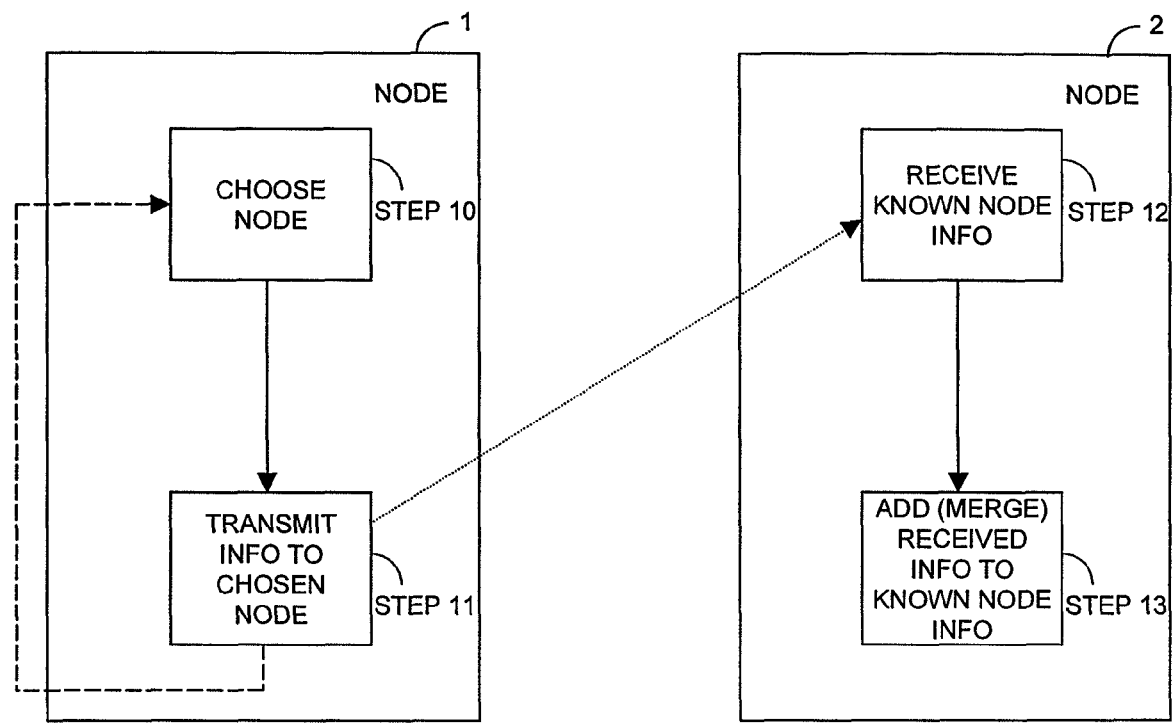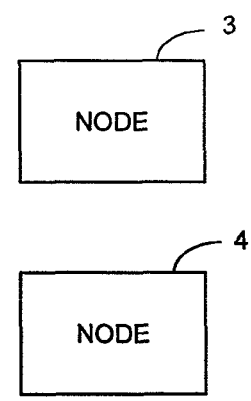
FIG. 2
NAME DROPPER

| | N2 | N3 | N4 | N9 | N10 | N12 | N13 |
|---|---|---|---|---|---|---|---|
| INITIALLY HAS INFO ABOUT | N2, N3 | N2, N3, N4 | N4, N9 | N9, N10 | N10, N12, N13 | N12, N13 | N12, N13 |
| ROUND 1 PICK | N3 | N2 | N9 | N10 | N12 | N13 | N12 |
| AFTER ROUND 1 HAS INFO ABOUT | N2, N3, N4 | N2, N3, N4 | N4, N9 | N4, N9, N10 | N9, N10, N12, N13 | N10, N12, N13 | N12, N13 |
| ROUND 2 PICK | N3 | N4 | N9 | N4 | N13 | N10 | N12 |
| AFTER ROUND 2 HAS INFO ABOUT | N2, N3, N4 | N2, N3, N4 | N2, N3, N4, N9, N10 | N4, N9, N10 | N9, N10, N12, N13 | N10, N12, N13 | N9, N10, N12, N13 |
| ROUND 3 PICK | N4 | N2 | N10 | N4 | N12 | N13 | N10 |
| AFTER ROUND 3 HAS INFO ABOUT | N2, N3, N4 | N2, N3, N4 | N2, N3, N4, N9, N10 | N4, N9, N10 | ALL | N9, N10, N12, N13 | N9, N10, N12, N13 |
| ROUND 4 PICK | N3 | N4 | N9 | N10 | N3 | N10 | N12 |
| AFTER ROUND 4 HAS INFO ABOUT | N2, N3, N4 | ALL | N2, N3, N4, N9, N10 | N2, N3, N4, N9, N10 | ALL | N9, N10, N12, N13 | N9, N10, N12, N13 |
| ROUND 5 PICK | N3 | N12 | N3 | N2 | N2 | N13 | N10 |
| AFTER ROUND 5 HAS INFO ABOUT | ALL | ALL | N2, N3, N4, N9, N10 | N2, N3, N4, N9, N10 | ALL | ALL | N9, N10, N12, N13 |
| ROUND 6 PICK | N13 | N2 | N9 | N10 | N3 | N9 | N4 |
| AFTER ROUND 6 COMPLETE | ALL | ALL | ALL | ALL | ALL | ALL | ALL |

FIG. 3

RANDOM POINTER JUMP

| | N2 | N3 | N4 | N9 | N10 | N12 | N13 |
|---|---|---|---|---|---|---|---|
| INITIALLY HAS INFO ABOUT | N2, N3 | N2, N3, N4 | N4, N9 | N9, N10 | N10, N12, N13 | N12, N13 | N13 |
| ROUND 1 PICK | N3 | N2 | N9 | N10 | N12 | N13 | N12 |
| AFTER ROUND 1 HAS INFO ABOUT | N2, N3, N4 | N2, N3, N4 | N4, N9, N10 | N9, N10, N12, N13 | N10, N12, N13 | N12, N13 | N12, N13 |
| ROUND 2 PICK | N3 | N4 | N9 | N12 | N13 | N13 | N12 |
| AFTER ROUND 2 HAS INFO ABOUT | N2, N3, N4 | N2, N3, N4, N9, N10 | N4, N9, N10, N12, N13 | N9, N10, N12, N13 | N10, N12, N13 | N12, N13 | N12, N13 |
| ROUND 3 PICK | N4 | N10 | N9 | N10 | N12 | N13 | N12 |
| AFTER ROUND 3 HAS INFO ABOUT | ALL | ALL | N4, N9, N10, N12, N13 | N9, N10, N12, N13 | N10, N12, N13 | N12, N13 | N12, N13 |

FIG. 5

| | N2 | N3 | N4 | N9 | N10 | N12 | N13 |
|---|---|---|---|---|---|---|---|
| INITIALLY HAS INFO ABOUT | N2, N3 | N2, N3, N4 | N4, N9 | N9, N10 | N10, N12, N13 | N12, N13 | N2, N13 |
| ROUND 1 PICK | N3 | N2 | N9 | N10 | N12 | N13 | N2 |
| AFTER ROUND 1 HAS INFO ABOUT | N2, N3, N4 | N2, N3, N4 | N4, N9, N10 | N9, N10, N12, N13 | N10, N12, N13 | N2, N12, N13 | N2, N3, N13 |
| ROUND 2 PICK | N3 | N4 | N9 | N12 | N13 | N13 | N3 |
| AFTER ROUND 2 HAS INFO ABOUT | N2, N3, N4 | N2, N3, N4, N9, N10 | N4, N9, N10, N12, N13 | N2, N9, N10, N12, N13 | N2, N3, N10, N12, N13 | N2, N3, N12, N13 | N2, N3, N4, N13 |
| ROUND 3 PICK | N4 | N10 | N12 | N10 | N2 | N3 | N4 |
| AFTER ROUND 3 HAS INFO ABOUT | ALL | ALL | ALL | N2, N3, N9, N10, N12, N13 | N2, N3, N4, N10, N12, N13 | ALL | ALL |
| ROUND 4 PICK | N3 | N4 | N9 | N2 | N3 | N10 | N12 |
| AFTER ROUND 4 COMPLETE | ALL | ALL | ALL | ALL | ALL | ALL | ALL |

FIG. 7

| | N2 | N3 | N4 | N9 | N10 | N12 | N13 |
|---|---|---|---|---|---|---|---|
| INITIALLY HAS INFO ABOUT | N2, N3 | N2, N3, N4 | N4, N9 | N9, N10 | N10, N12, N13 | N12, N13 | N13 |
| ROUND 1 PICK | N3 | N2 | N9 | N10 | N12 | N13 | N12 |
| AFTER ROUND 1 HAS INFO ABOUT | N2, N3, N4 | N2, N3, N4 | N4, N9, N10 | N4, N9, N10, N12, N13 | N9, N10, N12, N13 | N10, N12, N13 | N12, N13 |
| ROUND 2 PICK | N3 | N4 | N9 | N4 | N13 | N10 | N12 |
| AFTER ROUND 2 HAS INFO ABOUT | N2, N3, N4 | N2, N3, N4, N10 | ALL | N4, N9, N10, N12, N13 | N9, N10, N12, N13 | N9, N10, N12, N13 | N9, N10, N12, N13 |
| ROUND 3 PICK | N4 | N10 | N9 | N10 | N12 | N13 | N10 |
| AFTER ROUND 3 HAS INFO ABOUT | ALL | ALL | ALL | ALL | N4, N9, N10, N12, N13 | N9, N10, N12, N13 | N9, N10, N12, N13 |
| ROUND 4 PICK | N3 | N4 | N9 | N2 | N4 | N10 | N12 |
| AFTER ROUND 4 HAS INFO ABOUT | ALL | ALL | ALL | ALL | ALL | N4, N9, N10, N12, N13 | N9, N10, N12, N13 |
| ROUND 5 PICK | N9 | N12 | N3 | N13 | N2 | N13 | N10 |
| AFTER ROUND 5 COMPLETE | ALL | ALL | ALL | ALL | ALL | ALL | ALL |

FIG. 10

12# SYSTEM AND METHOD FOR RESOURCE DISCOVERY

RELATED APPLICATIONS

This application is a continuation of and claims priority to and the benefit of U.S. patent application Ser. No. 09/576,676, which was filed on May 23, 2000 and which claimed priority to and the benefit of U.S. provisional patent application Ser. No. 60/135,473, filed May 24, 1999, the disclosures of which are hereby both incorporated herein by reference in their entirety.

STATEMENT REGARDING FEDERALLY SPONSORED RESEARCH

Work described herein was supported by Federal Grant No. DAAH04-95-10607, awarded by the United States Army, and Federal Grant No. N00014-95-1-1246, awarded by DARPA. The Government has certain rights in the invention.

TECHNICAL FIELD

This invention relates to computer networking, and more particularly, to resource discovery in distributed networks.

BACKGROUND INFORMATION

In large and distributed computer networks, there are various applications for which it is useful to have some subset of networked nodes cooperate to perform a common task. For example, nodes may cooperate to implement a distributed web caching protocol, to form a distributed file system, to coordinate routing or forwarding of network traffic, to provide a shared memory or data storage, or to perform some distributed computation. Generally, as a first step for the nodes to cooperate, they must have some knowledge about each other, because, notwithstanding special cases like broadcast or multicast, a node generally can not communicate with a node on the network that it does not know about. If the cooperating nodes do not initially have information about all the other cooperating nodes, as is often the case for distributed cooperation, they typically attempt to "discover" other cooperating computers.

Frequently, each cooperating node has knowledge about one or more other cooperating nodes, but not all of the cooperating nodes. The problem of finding out about the other cooperating nodes is referred to as "resource discovery." It is useful for resource discovery techniques to be efficient both in terms of time to complete discovery and in use of communications resources, where communications resources includes such resources as network bandwidth and node processing and memory. Generally, resource discovery is considered efficient in time if the nodes learn about each other quickly, and considered efficient in resources if the nodes learn about each other without using an inordinate amount of the network's or the nodes' communication resources. This is particularly important in applications where a method may repeatedly be used to obtain updated information about the cooperating nodes.

For descriptive purposes, resource discovery methods are frequently said to be performed in "rounds," where a round is the time that it takes for each cooperating node to complete a task. For example, a round can be the time that it takes for each cooperating node to contact some number of cooperating nodes. For the purposes of explanation, a resource discovery method is said to be "complete" when every cooperating node has information about every other cooperating node. In practice, resource discovery may never be complete, because the cooperating node information may change with such parameters as user load, as well as with the addition and removal of cooperating nodes from the network or the cooperation scheme.

One example of a resource discovery technique involves use of the "flooding" algorithm. In the flooding algorithm, each node is initially configured to communicate with a fixed set of cooperating nodes, and direct communication is only allowed with nodes in this set. In each round, a system implementing the flooding algorithm contacts all of the nodes in the fixed set and transmits to them cooperating node information updates. The updates are the cooperating node information that has changed since the last time the node provided information to its set of cooperating nodes. A cooperating node receives the updates, then communicates the updates to its fixed set of communication partners by passing on any new information.

Generally, the flooding algorithm is not efficient both in terms of time and resources, as each node repeatedly contacts each of the nodes in its fixed set. As the number of nodes the set grows, the flooding algorithm can be somewhat efficient in terms of time, but will be inefficient in terms of resources. The flooding algorithm is used by Internet routers today, with the variation that Internet routers are designed with the capability of opening connections to all machines they have information about, not just machines in the "initial set."

For example, such a resource discovery technique involves use of the "swamping" algorithm. The swamping algorithm is similar to the flooding algorithm except that, in each round, each node opens connections with all of the cooperating nodes that it has information about and communicates the updates to each such node that it has information about. An advantage of the swamping algorithm is that resource discovery is completed quite quickly compared to other techniques, so that it is efficient in terms of time. A disadvantage of the swamping algorithm is inefficient in terms of resources because the communication resources required are significant. The speed of the swamping algorithm comes at the cost of wasted communications resources where many nodes are provided information about nodes that they already have information about. In the final rounds, each node communicates with almost every other cooperating node.

SUMMARY OF THE INVENTION

The present invention provides for the necessary resource discovery while avoiding the problems associated with the prior art methods. In distributed networks of cooperating nodes, it is useful to perform resource discovery in a manner that can complete quickly and also uses communications resources efficiently. A system and method in which nodes in a network are provided with information about the presence of, as well as other information about, other cooperating nodes in the network provides tangible benefits. Just as a few examples, such a system and method can be useful for distributed storage (i.e. database, file systems, caching) and distributed processing (i.e. computation) applications, as well as other cooperative tasks such as routing or coordinating network traffic.

In general, in one aspect, the invention features a method for discovery of cooperating nodes in a network of nodes in which each cooperating node has information about at least one other cooperating node. The method includes selecting, by a first node, from cooperating node information available to the first node, a second node. The method also includes transmitting from the first node to the second node at least a portion of the cooperating node information available to the first node. The method also includes periodically repeating these steps.

In one embodiment, the method includes randomly choosing the second node. In another embodiment, the method includes pseudo-randomly choosing the second node. In another embodiment, the method includes choosing the second node by selecting from an ordered list.

In one embodiment, the method includes choosing by a first node, from cooperating node information stored in the first node, one second node. In another embodiment, the method also includes transmitting from the first node to the second node at least a portion of the cooperating node information available to the first node, the cooperating node information includes a list of cooperating nodes and resources available at each cooperating node. In another embodiment, the first node transmits to the second node all of the first node's cooperating node information. In another embodiment, the steps are periodically repeated by each of the cooperating nodes.

In another embodiment, a second and third node are chosen, and the first node transmits cooperating node information to the second and third nodes. In another embodiment, a small number of cooperating nodes are selected, and the first node transmits cooperating node information to each of the small number of selected cooperating nodes.

In another embodiment, the method also includes merging, by the second node, the cooperating node information transmitted by the first node with cooperating node information available to the second node. In another embodiment, the method also includes requesting, by the first node, from the selected cooperating node, at least a portion of the cooperating node information available to the second node, and receiving, by the first node, from the second node, at least a portion of the cooperating node information available to the second node. In another embodiment, the method also includes merging, by the second node, the cooperating node information transmitted by the first node with cooperating node information available to the second node, requesting, by the first node, from the selected cooperating node, at least a portion of the cooperating node information available to the second node, receiving, by the first node, from the selected cooperating node, at least a portion of the cooperating node information available to the second node, and merging, by the first node, the cooperating node information transmitted by the second node with cooperating node information available to the first node.

In general, in another aspect, the invention relates to a system of cooperating nodes in which each cooperating node can discover information about the other cooperating nodes. The system includes network nodes, and each of the network nodes includes a selector for selecting, from cooperating node information available to the node, a second node, a transmitter for transmitting from the first node to the second node at least a portion of the cooperating node information available to the first node, and a timer control for periodically triggering the chooser and the transmitter.

In general, in another aspect, the invention relates to a method for discovery of cooperating nodes in a network of nodes in which each cooperating node has information about at least one other cooperating node. The method includes selecting, by a first node, from cooperating node information available to the first node, a second cooperating node. The method also includes requesting, by the first node, from the second node, at least a portion of the cooperating node information available to the second node. The method also includes receiving, by the first node, from the second node, at least a portion of the cooperating node information available to the second node. The method also includes periodically repeating these steps.

In one embodiment, the method includes randomly choosing the second node. In another embodiment, the method includes pseudo-randomly choosing the second node. In another embodiment, the method includes choosing the second node by selecting from an ordered list.

In one embodiment, the cooperating node information includes a list of cooperating nodes and resources available at each cooperating node. In another embodiment, the cooperating node information requested includes all of the second node's cooperating node information. In another embodiment, the steps are periodically repeated by each of the cooperating nodes.

In another embodiment, a second and third node are chosen, and the first node requests and receives cooperating node information from the second and third nodes. In another embodiment, a small number of cooperating nodes are selected, and the first node requests and receives cooperating node information from each of the small number of selected cooperating nodes.

In another embodiment, the method also includes merging, by the first node, the received cooperating node information with cooperating node information available to the first node. In another embodiment, the method also includes transmitting from the first node to the second node, at least a portion of the cooperating node information available to the first node. In another embodiment, the method also includes merging, by the second node, the cooperating node information transmitted by the first node with cooperating node information available to the second node.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 2 is a block diagram of an embodiment of a resource discovery method according to the invention.

FIG. 3 is an example of the method of FIG. 2 applied to the example network of FIG. 1.

FIG. 5 is an example of the method of FIG. 4 applied to the example network illustrated in FIG. 1.

FIG. 7 is an example of the method of FIG. 4 applied to the example network of FIG. 6.

FIG. 10 is an example of the method of FIG. 6 applied to the example network illustrated in FIG. 1.

DESCRIPTION

Figure 1:
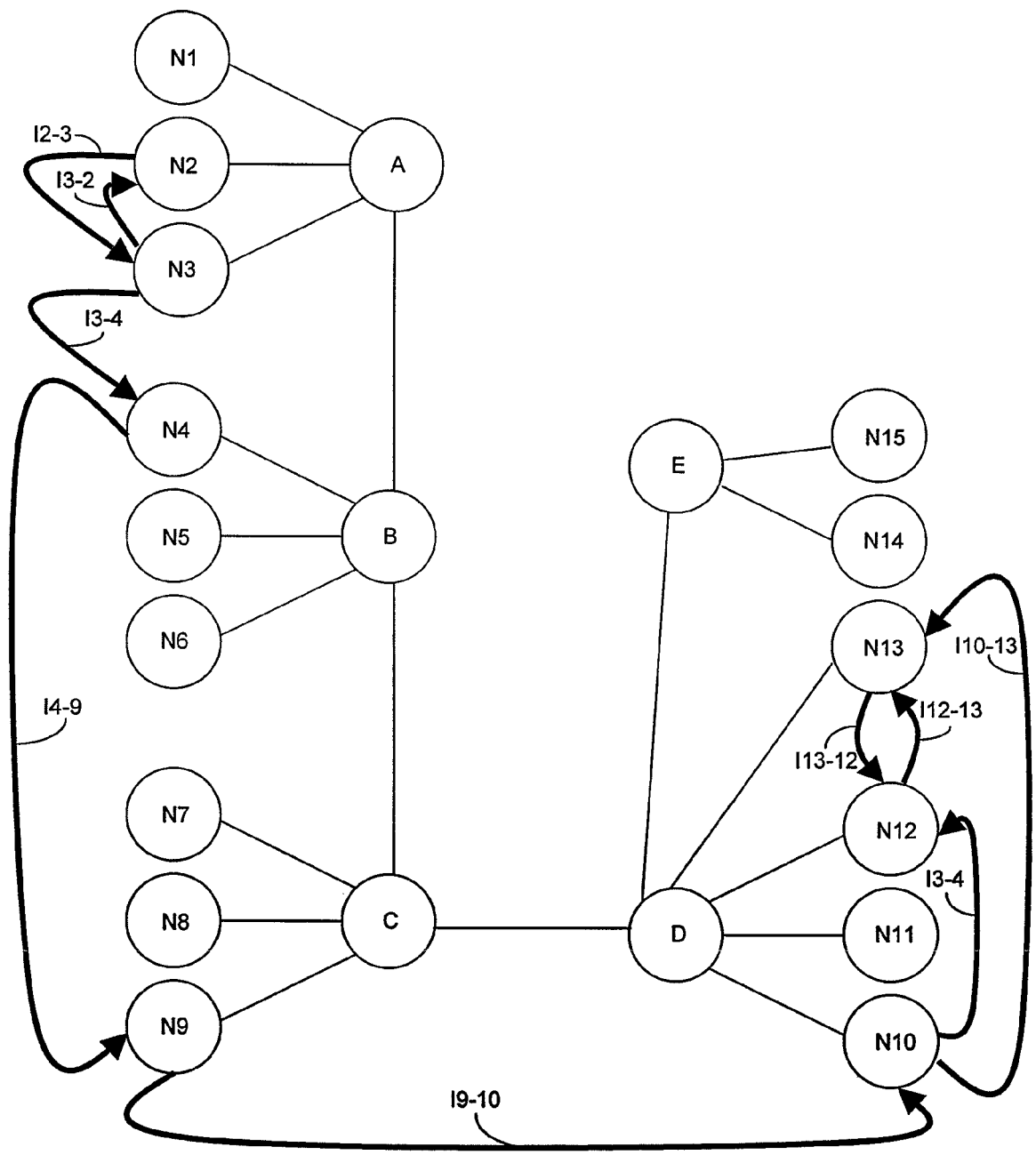
FIG. 1 is a block diagram illustrating an example network containing cooperating and non cooperating nodes.

Referring to FIG. 1, an example network is shown with nodes N1, N2, and N3 connected to node A, nodes N4, N5, and N6 connected to node B, nodes N7, N8, and N9 connected to node C, nodes N10, N11, N12, and N13 connected to node D, and nodes N14 and N15 connected to node E. The nodes A-E, N1-N15 are exemplary network elements, which may be typical networked devices, such as computers, workstations, mainframes, thin clients, routers, switches, caches, network appliances, and so on, as well as such other devices that are or can be connected to a network. The system and method of the invention can be used with the various kinds of networks, which utilize one or more of the various networking protocols. In the example of FIG. 1, the connections between the network elements utilize a communications protocol such as TCP/IP, which is in wide use throughout the Internet. The high-level nodes A-E pass packets of data between the lower-level nodes N1-N15. The network of FIG. 1 is exemplary, and not intended to limit in terms of numbers of nodes, levels, protocols, etc. the scope of the invention.

In the example of FIG. 1, nodes N2, N3, N4, N9, N10, N12, and N13 are cooperating nodes, also referred to as cooperative nodes. In this example, as an initial matter cooperating nodes N2, N3, N4, N9, N10, N12, N13 each have information about one or two the other cooperating nodes. Specifically, node N2 has information about N3 (shown in FIG. 1 as arrow I2-3), N3 has information about N2 (I3-2) and N4 (I4-2), N4 has information about N9 (I4-9), N9 has information about N10 (I9-10), N10 has information about N12 (I10-12) and N13 (I10-13), N12 has information about N13 (I12-13) and N13 has information about N12 (I13-12). A resource discovery method employed by the cooperating nodes N2, N3, N4, N9, N10, N12, N13 allows the cooperating nodes to discover each other, and provides each cooperating node with cooperating node information about the other cooperating nodes. The method steps are repeatedly performed by each of the cooperating nodes N2, N3, N4, N9, N10, N12, N13 so that each of the cooperating nodes N2, N3, N4, N9, N10, N12, N13 eventually learns about the other cooperating nodes N2, N3, N4, N9, N10, N12, N13.

Generally, as used here, cooperating node information includes a list of the known cooperating nodes. In one embodiment, the cooperating node information includes the network addresses of the cooperating node. In another embodiment, the cooperating node information also includes other contact data for a cooperating node. The cooperating node information can also include a description of the resources of a cooperating node, the availability of resources of a cooperating node, and other data useful for performing the cooperative task. For example, if the nodes are cooperating to perform routing, the cooperating node information can include the networks and/or nodes that are accessible to a node. As another example, if the nodes are cooperating to perform content caching, the cooperating node information can include a description of the content cached by the node, the number of connections that can be serviced by the node, the geographic or network topology location of the node, and so on. In one embodiment, the cooperating node information includes information only about cooperating nodes, and in another embodiment, the cooperating node information also includes some information about nodes that are not cooperating.

Initially, each node has information about at least one other cooperating node. The nodes can be provided with this information at initial configuration, that is a node can be provided with the address of at least one cooperating node, or the address of a node that will provide it with information about a cooperating node. In another embodiment, information about a new node is provided to one of the cooperating nodes, which contacts the new node and provides it with its initial cooperating node information. For simplicity, in the following examples, each node initially has some cooperating node information, however, it is intended that having information about at least one other cooperating node also includes the capability of obtaining such information.

Referring to FIG. 2, one first node 1 is taken as an example representing each of the cooperating nodes in the network. The first node 1 has some information about other cooperating nodes. In the first round, the first node 1 chooses another node from the set of cooperating nodes about which the first node 1 has information (STEP 10). In the example of FIG. 1, the node chosen is the second node 2. It should be understood that the first node 1 and the chosen second node 2 are examples demonstrating the activity of each of the nodes in a cooperative system.

In this and in the other embodiments of resource discovery methods described here, the selection of a node can be made randomly, pseudorandomly, or by selecting nodes in a particular order. In one embodiment, the choice of another node is made by randomly choosing a node. In another embodiment, the choice is made pseudorandomly by use of a predetermined pseudorandom selection algorithm. In another embodiment, the node is chosen by selecting each node in the set of known nodes in a particular order, such that over time each node is chosen approximately the same number of times. It is provable that, for the embodiment of FIG. 2, if the selection process is random, and the node information is static, the number of rounds required until every node has information about every other node is no more than $O(\log^2 n)$ rounds, where (n) is the number of cooperative nodes, and O is a constant. Even if the choices are not strictly random (that is, they are pseudorandom, etc.), the system and method is useful, but the time until completion, which is when all of the nodes know about each other, is presently not provable.

In one embodiment, the first node 1 transmits information to the second node 2 (STEP 11). In one embodiment, the information is cooperating node information that includes information about all the cooperating nodes about which the first node 1 has information. In another embodiment, the information also includes information about the first node. In another embodiment, the cooperating node information includes updates since the last time that the first node 2 communicated with the second node 2.

The second node 2 receives the information from the first node 1 (STEP 12). The second node combines (adds or merges) the information about nodes about which the second node has information with the received information (STEP 13). In one embodiment, the second node 2 adds the information received from the first node to a database or list of known node information. In one embodiment, the adding or merging step includes the second node 2 eliminating duplicate information about nodes that the first node 1 and second node 2 both have information about.

This concludes the first round from the point of view of the first node 1. In the next round, the first node 1 repeats the steps just described. That is, the first node 1 chooses a node to communicate with, which is most likely, but not necessarily, a node other than the just previously chosen node 2. For example, the first node 1 may choose a different second node 3, and communicate information with that different second node 3. This method is sometimes referred to as the "name dropper" method, because, by rough analogy, each node tells each other node about the nodes for which they have information.

In a cooperative system, each cooperating node in the system, not just the first node 1, repeats the steps just described during each round. Each participating node, like the first node 1 in the above example, thus communicates the information it has to one other node in each round. Communication of information by each node to one other node is efficient in terms of use of system resources and network bandwidth. The costs and benefits can be fine tuned by communicating with two or a small number of nodes, depending on the number of nodes, and the completion time requirements.

In one embodiment, the repetition of these steps by each of the nodes is ongoing while the node is operating. The rounds take place at an appropriate time interval (for example once every number of seconds, minutes, hours, or some combination) so that each node will have sufficient time to complete its operation. In one embodiment, the interval is consistent. In another embodiment, the interval changes over time, so that initially the rounds occur more quickly, as the nodes are provided with initial information about each other, and then are spaced apart as the nodes have each received information about each of the other nodes and are only sharing updates as cooperative nodes are added and removed from the cooperative task.

In a variation of the system described above, various nodes perform the tasks associated with a round at different rates or times, so that, for example, one node might complete three repetitions of the method in the time that it takes another node to complete one. In this embodiment, there is no particular "round" that is taking place at any specific time.

Referring to FIG. 3, using the example of a network of FIG. 1 to demonstrate the method of FIG. 2, a cooperating node N2, N3, N4, N9, N10, N12 or N13 selects from the cooperating nodes about which it has information. In this example, in the first round node N2 has information about itself (N2) and N3. Node N3 has information about itself (N3) and nodes N2 and N4. Node N4 has information about itself (N4) and node N9. Node N9 has information about itself (N9) and node N10. Node N10 has information about itself (N10) and nodes N12 and N13. Node 12 has information about itself (N12) and node N13. Node N13 has information about itself (N13) and node N12. This is shown on the first line of the table in FIG. 3.

Round 1. In the first round, each node chooses (STEP 10) a node about which it has information (not including itself). The node that is chosen is shown in the second line as the "ROUND 1 PICK." In this example, in the first round, node N2 chooses node N3, node N3 chooses node N2, node N4 chooses node N9, node N9 chooses node N10, node N10 chooses node N12, node N12 chooses node N13, and node N13 chooses node N12.

Each node transmits the information that it has to the chosen node (STEP 11). In this example, node N2 communicates its information about node N2 (itself) and node N3 to node N3. Node N3 communicates its information about nodes N2, N3, and N4 to node N2. Node N4 communicates information about nodes N4 and N9 to node N9. Node N9 communicates information about nodes N9 and N10 to node N10. Node N10 communicates information about nodes N10, N12, and N13 to node N12. Node N12 communicates information about nodes N12 and N13 to node N13. Node N13 communicates information about nodes N12 and N13 to node N12.

Each node receives the information that is transmitted to it (STEP 12) and adds or merges the information that it receives with the information that it has (STEP 13). Thus, after the completion of round 1, node N2 has information about nodes N2, N3, and N4. Node N3 has information about nodes N2, N3, and N4. Node N4 has information about nodes N4, and N9. Node N9 has information about nodes N4, N9, and N10. Node N10 has information about node N9, N10, N12, and N13. Node N12 has information about nodes N10, N12, and N13. Node N13 has information about nodes N12, and N13.

It should be noted that this description assumes that each node communicates with another node during the same time interval, so that information that is received by a node is not passed on to other nodes until the next round. This assumption is not a requirement and this assumption is used here only for demonstrative purposes. In fact, if communication takes place at different times, there may be such benefits as lower peak bandwidth demand on the network, and the opportunity for cooperating node information to be passed on to multiple nodes in the same round.

Round 2. In the second round, each node chooses (STEP 10) a node about which it has information (not including itself). The node that is chosen is shown in the fourth line of the table of FIG. 3 as the "ROUND 2 PICK." In this example, in the second round, node N2 chooses node N3, node N3 chooses node N4, node N4 chooses node N9, node N9 chooses node N4, node N10 chooses node N13, node N12 chooses node N10, and node N13 chooses node N12.

Each node transmits the information that it has to the chosen node (STEP 11). In this example, node N2 communicates its information about nodes N2, N3, and N4 to node N3. Node N3 communicates its information about nodes N2, N3, and N4 to node N4. Node N4 communicates information about nodes N4, and N9 to node N9. Node N9 communicates information about nodes N4, N9, and N10 to node N4. Node N10 communicates information about nodes N9, N10, N12, and N13 to node N13. Node N12 communicates information about nodes N10, N12, and N13 to node N10. Node N13 communicates information about nodes N12, and N13 to node N12.

Each node receives the information that is transmitted to it during that round (STEP 12) and adds or merges it with the information that it has (STEP 13). Thus, after the completion of the second round, node N2 has information about nodes N2, N3, and N4. Node N3 has information about nodes N2, N3, and N4. Node N4 has information about nodes N2, N3, N4, N9, and N10. Node N9 has information about nodes N4, N9, and N10. Node N10 has information about nodes N9, N10, N12, and N13. Node N12 has information about nodes N10, N12, and N13. Node N13 has information about nodes N9, N10, N12, and N13.

Round 3. In the third round, each node chooses (STEP 10) a node about which it has information (not including itself). The node that is chosen is shown in the sixth line of the table of FIG. 3 as the "ROUND 3 PICK." In this example, in the third round, node N2 chooses node N4, node N3 chooses node N2, node N4 chooses node N10, node N9 chooses node N4, node N10 chooses node N12, node N12 chooses node N13, and node N13 chooses node N10.

Each node transmits the information that it has to the chosen node (STEP 11). In this example, node N2 communicates its information about nodes N2, N3, and N4 to node N4. Node N3 communicates its information about nodes N2, N3, and N4 to node N2. Node N4 communicates information about nodes N2, N3, N4, N9, and N10 to node N10. Node N9 communicates information about nodes N4, N9, and N10 to node N4. Node N 10 communicates information about nodes N9, N10, N12, and N13 to node N12. Node N12 communicates information about nodes N10, N12, N13 to node N13. Node N13 communicates information about nodes N9, N10, N12, and N13 to node N10.

Each node receives the information that is transmitted to it during that round (STEP 12) and merges it with the information that it has (STEP 13). Thus, after the completion of the third round, node N2 has information about nodes N2, N3, and N4. Node N3 has information about nodes N2, N3, and N4. Node N4 has information about nodes N2, N3, N4, N9, and N10. Node N9 has information about nodes N4, N9, and N10. Node N10 has information about all cooperating nodes (i.e., nodes N2, N3, N4, N9, N10, N12, and N13). Node N12 has information about nodes N9, N10, N12, and N13. Node N13 has information about nodes N9, N10, N12, and N13.

Round 4. In the fourth round, each node chooses (STEP 10) a node about which it has information (not including itself). The node that is chosen is shown in the eighth line of the table of FIG. 3 as the "ROUND 4 PICK." In this example, in the fourth round, node N2 chooses node N3, node N3 chooses node N4, node N4 chooses node N9, node N9 chooses node N10, node N10 chooses node N3, node N12 chooses node N10, node N13 chooses node N12.

Each node transmits the information that it has to the chosen node (STEP 11). In this example, node N2 communicates its information about nodes N2, N3, and N4 to node N3. Node N3 communicates its information about nodes N2, N3, and N4 to node N4. Node N4 communicates information about nodes N2, N3, N4, N9, and N10 to node N9. Node N9 communicates information about nodes N4, N9, and N10 to node N10. Node N10 communicates information about all cooperating nodes to node N3. Node N12 communicates information about nodes N9, N10, N12, and N13 to node N10. Node N13 communicates information about nodes N9, N10, N12, and N13 to node N12.

Each node receives the information that is transmitted to it during that round (STEP 12) and adds or merges it with the information that it has (STEP 13). Thus, after the completion of the fourth round, node N2 has information about nodes N2, N3, and N4. Node N3 has information about all cooperating nodes. Node N4 has information about nodes N2, N3, N4, N9, and N10. Node N9 has information about nodes N2, N3, N4, N9, and N10. Node N10 has information about all cooperating nodes. Node N12 has information about nodes N9, N10, N12, and N13. Node N13 has information about nodes N9, N10, N12, and N13.

Round 5. In the fifth round, each node chooses (STEP 10) a node about which it has information (not including itself). The node that is chosen is shown in the tenth line of the table of FIG. 3 as the "ROUND 5 PICK." In this example, in the fifth round, node N2 chooses node N3, node N3 chooses node N12, node N4 chooses node N3, node N9 chooses node N2, node N10 chooses node N2, node N12 chooses node N13, and node N13 chooses node N10.

Each node transmits the information that it has to the chosen node (STEP 11). In this example, node N2 communicates its information about N2, N3, and N4, to node N3. Node N3 communicates its information about all other cooperating nodes, to node N12. Node N4 communicates information about nodes N2, N3, N4, N9, and N10 to node N3. Node N9 communicates information cooperating nodes N2, N3, N4, N9, and N10 to node N2. Node N10 communicates information about all cooperating nodes to node N2. Node N12 communicates information about nodes N9, N10, N12, and N13 to node N13. Node N13 communicates information about nodes N9, N10, N12, and N13 to node N10.

Each node receives the information that is transmitted to it during that round (STEP 12) and adds or merges it with the information that it has (STEP 13). Thus, after the completion of the fifth round, nodes N2, N3, N10, N12, and N13 now have information about all other cooperating nodes. Nodes N4 and N9 have information about nodes N2, N3, N4, N9, and N10.

Round 6. In the sixth round, each node chooses (STEP 10) a node about which it has information (not including itself). The node that is chosen is shown in the twelfth line of the table of FIG. 3 as the "ROUND 6 PICK." In this example, in the sixth round, node N2 chooses node N13, node N3 chooses node N2, node N4 chooses node N9, node N9 chooses node N10, node N10 chooses node N3, node N12 chooses node N9, and node N13 chooses node N4.

Each node transmits the information that it has to the chosen node (STEP 11). In this example, node N2 communicates its information about all cooperating nodes to node N13. Node N3 communicates its information about all other cooperating nodes to node N2. Node N4 communicates information about nodes N2, N3, N4, N9, and N10 to node N9. Node N9 communicates information about nodes N2, N3, N4, N9, and N10 to node N10. Node N10 communicates information about all cooperating nodes to node N3. Node N12 communicates information about all other cooperating nodes to node N9. Node N13 communicates information about all other cooperating nodes to node N4.

Each node receives the information that is transmitted to it during that round (STEP 12) and merges it with the information that it has (STEP 13). Thus, after the completion of the sixth round, all cooperating nodes now have information about all other cooperating nodes. The method is referred to as "complete" because all cooperating nodes know about the other nodes. This example assumes static (unchanging) cooperating nodes. If the information about the cooperating nodes changed dynamically, the method would keep the nodes information current, but not complete.

In a variation of the embodiment of FIG. 2, a receiving node can receive multiple transmissions of information from multiple transmitting nodes, and then add or merge the aggregation of the received information once, after all transmissions expected or scheduled for a particular period of time have occurred or have lapsed from a time out occurrence.

Figure 4:
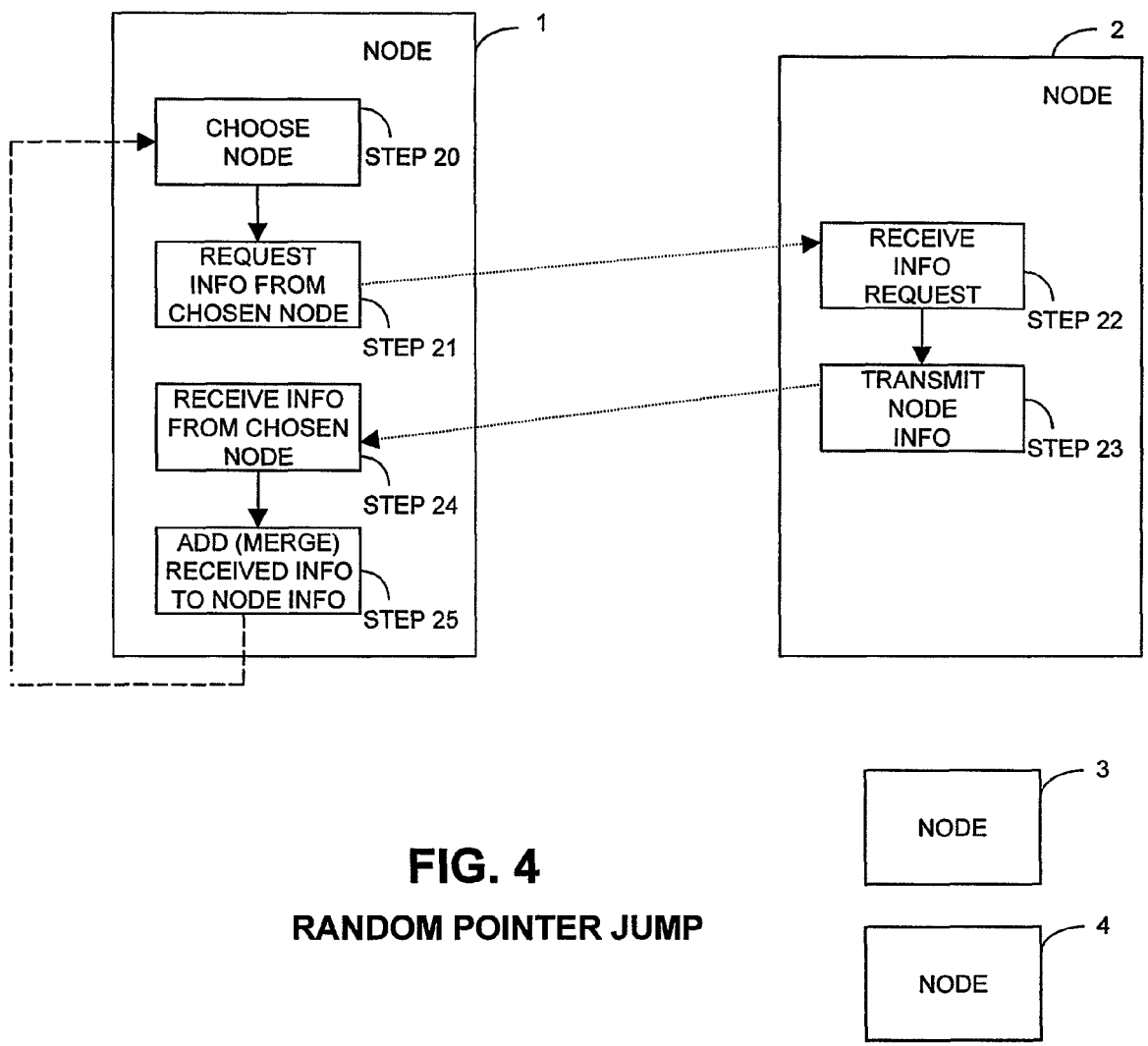
FIG. 4 is a block diagram of another embodiment of a method for resource discovery according to the invention.

Referring to FIG. 4, in another embodiment of a method for resource discovery, in the first round, the first node 1 chooses (as in the embodiment of FIG. 1) a node from the set of cooperative nodes about which the first node 1 has information (STEP 20). In this example, the node chosen is the second node 2.

In this embodiment, the first node 1 requests node information from the second node 2 (STEP 21). The second node receives the information request (STEP 22), and the second node 2 transmits node information to the first node 1 (STEP 23). In one embodiment, the information includes a list of the nodes that the second node 2 has information about. In another embodiment, the node information also includes other information about the second node 2.

The first node 1 receives the information from the second node 2 (STEP 24). The first node 1 merges the received information about nodes that the second node has information about with the node information that the first node 1 already has (STEP 25). In one embodiment, the first node 1 adds the information received from the second node 2 to a database or list of known nodes and node information. In one embodiment, the merging step includes the first node 1 eliminating duplicate information about nodes about which the first node 1 and second node 2 both have information.

This concludes the first round. In the next round, the first node 1 repeats the steps just described. In the next round, the first node 1 again chooses a node to communicate with, which is most likely a node other than the just previously chosen node 2. For example, the first node 1 may choose a second node 3, and communicate information with that other node 3.

In a cooperative system, each cooperative node, not just the first node 1, repeats the steps just described in each round. Each participating node, like the first node 1 in the above example, thus communicates with one other node in each round. Communication of information with the one other node is efficient in terms of use of system resources and network bandwidth. This method is sometimes referred to as the random pointer jump method, because the node that is pointed to provides the information.

Referring to FIG. 5, the example of the network of FIG. 1 is used to demonstrate the method of FIG. 4. In this method, a node selects from the set of cooperating nodes that it has information about and communicates with and requests information from those cooperating nodes. In this example, as shown on the first line of the table of FIG. 5, each node has information about the following nodes.

Node N2 has information about itself (N2) and N3. Node N3 has information about itself (N3) and nodes N2 and N4. Node N4 has information about itself (N4) and node N9. Node N9 has information about itself (N9) and node N10. Node N10 has information about itself (N10) and nodes N12 and N13. Node N12 has information about itself (N12) and node N13. Node N13 has information about itself (N13) and node N12.

Round 1. In the first round, each node chooses (STEP 20) a node about which it has information (not including itself). The node that is chosen is shown in the second line as the "ROUND 1 PICK." In this example, in the first round, node N2 chooses node N3, node N3 chooses node N2, node N4 chooses node N9, node N9 chooses node N10, node N10 chooses node N12, node N12 chooses node N13, and node N13 chooses node N12. Each node receives information from the chosen node. (STEP 24).

In this example, node N2 requests and receives information from node N3, its chosen node. Node N3 communicates information about nodes N2, N3, and N4 to node N2. Node N3 requests and receives information from Node N2, its chosen node. Node N2 communicates information about nodes N2 and N3 to node N3. Node N4 requests and receives information from node N9, its chosen node. Node N9 communicates information about nodes N9 and N10 to node N4. Node N9 requests and receives information from node N10, its chosen node. Node 10 communicates information about nodes N10, N12, and N13 to node N9. Node N10 requests and receives information from Node N12, its chosen node. Node 12 communicates information about nodes N12 and N13 to node N10. Node N12 requests and receives information from node N13, its chosen node. Node N13 communicates information about nodes N12 and N13 to node N12. Node N13 requests and receives information from node N12, its chosen node. Node N12 communicates information about nodes N12 and N13 to node N13.

Each node receives the information that is transmitted to it (STEP 24) and merges the information that it receives with the information that it has (STEP 25). Thus, after the completion of Round 1, node N2 has information about nodes N2, N3, and N4. Node N3 has information about nodes N2, N3, and N4. Node N4 has information about nodes N4, N9, and N10. Node N9 has information about nodes N9, N10, N12, and N13. Node N10 has information about node N10, N12, and N13. Node N12 has information about nodes N12 and N13. Node N13 has information about nodes N12 and N13.

It should be noted that this example, as in the earlier example of FIG. 3, assumes for demonstrative purposes that each node communicates with another node during the same time interval, so that information that is received by a node is not passed on until the next round. This assumption is not a requirement. In fact, if communication takes place at different times, there may be such benefits as lower peak bandwidth requirements, and the opportunity for cooperating node information to be passed on to multiple nodes in the same round.

Round 2. In the second round, each node chooses (STEP 20) a node about which it has information (not including itself). The node that is chosen is shown in the fourth line of the table of FIG. 5 as the "ROUND 2 PICK." In the second round, node N2 chooses node N3, node N3 chooses node N4, node N4 chooses node N9, node N9 chooses node N12, node N10 chooses node N13, node N12 chooses node N13, and node N13 chooses node N12. Each node receives cooperating node information from the chosen node in that round.

Node N2 receives information from node N3, its chosen node. Node N3 communicates its information about nodes N2, N3, and N4 to node N2. Node N3 receives information from node N4, its chosen node. Node N4 communicates its information about nodes N4, N9, and N10 to node N3. Node N4 receives information from node N9, its chosen node. Node N9 communicates its information about nodes N9, N10, N12, and N13 to node N4. Node N9 receives information from node N12, its chosen node. Node N12 communicates its information about nodes N12 and N13. Node N10 receives information from node N13, its chosen node. Node 13 communicates its information about nodes N12 and N13 to node N10. Node N12 receives information from node N13, its chosen node. Node 13 communicates its information about nodes N12 and N13 to node N12. Node N13 receives information from node N12, its chosen node. Node 12 communicates its information about nodes N12 and N13 to node N13.

Each node receives the information that is transmitted to it (STEP 24) and adds or merges the information that it receives with the information that it has (STEP 25). Thus, after the completion of Round 2, node N2 has information about nodes N2, N3, and N4. Node N3 has information about nodes N2, N3, N4, N9, and N10. Node N4 has information about nodes N4, N9, N10, N12, and N13. Node N9 has information about nodes N9, N10, N12, and N13. Node N10 has information about node N10, N12, and N13. Node N12 has information about nodes N12 and N13. Node N13 has information about nodes N12 and N13.

Round 3. Each node chooses (STEP 20) a node about which it has information (not including itself). The node that is chosen is shown in the sixth line as the "ROUND 3 PICK." In the third round, node N2 chooses node N4, node N3 chooses node N10, node N4 chooses node N9, node N9 chooses node N10, node N10 chooses node N12, node N12 chooses node N13, and node N13 chooses node N12. Each node receives the information from the chosen node.

Node N2 receives information from node N4, its chosen node. Node N4 communicates its information about nodes N4, N9, N10, N12, and N13 to node N2. Node N3 receives information from node N10, its chosen node. Node N10 communicates its information about nodes N10, N12, and N13 to node N3. Node N4 receives information from node N9, its chosen node. Node N9 communicates its information about nodes N9, N10, N12, and N13 to node N4. Node N9 receives information from node N10, its chosen node. Node N10 communicates its information about nodes N10, N12, and N13 to node N9. Node N10 receives information from node N12, its chosen node. Node 12 communicates its information about nodes N12 and N13 to node N10. Node N12 receives information from node N13, its chosen node. Node 13 communicates its information about nodes N12 and N13 to node N12. Node N13 receives information from node N12, its chosen node. Node 12 communicates its information about nodes N12 and N13 to node N13.

Each node receives the information that is transmitted to it (STEP 24) and adds or merges the information that it receives with the information that it has (STEP 25). Thus, after the completion of Round 3, node N2 has information about all other cooperating nodes. Node N3 has information about all other cooperating nodes. Node N4 has information about nodes N4, N9, N10, N12, and N13. Node N9 has information about nodes N9, N10, N12, and N13. Node N10 has information about node N10, N12, and N13. Node N12 has information about nodes N12 and N13. Node N13 has information about nodes N12 and N13.

It is interesting to note that, even with a static set of nodes, this example will not complete. Node N12, for example, only has information about nodes N12 and N13, and node 13 only has information about nodes N12 and N13. These nodes can not get information about any other nodes. This situation has occurred the example of FIG. 1 does not have sufficient initial knowledge distributed among the cooperating nodes. A slight change to the connectivity of the cooperating nodes will allow the system to complete.

Figure 6:
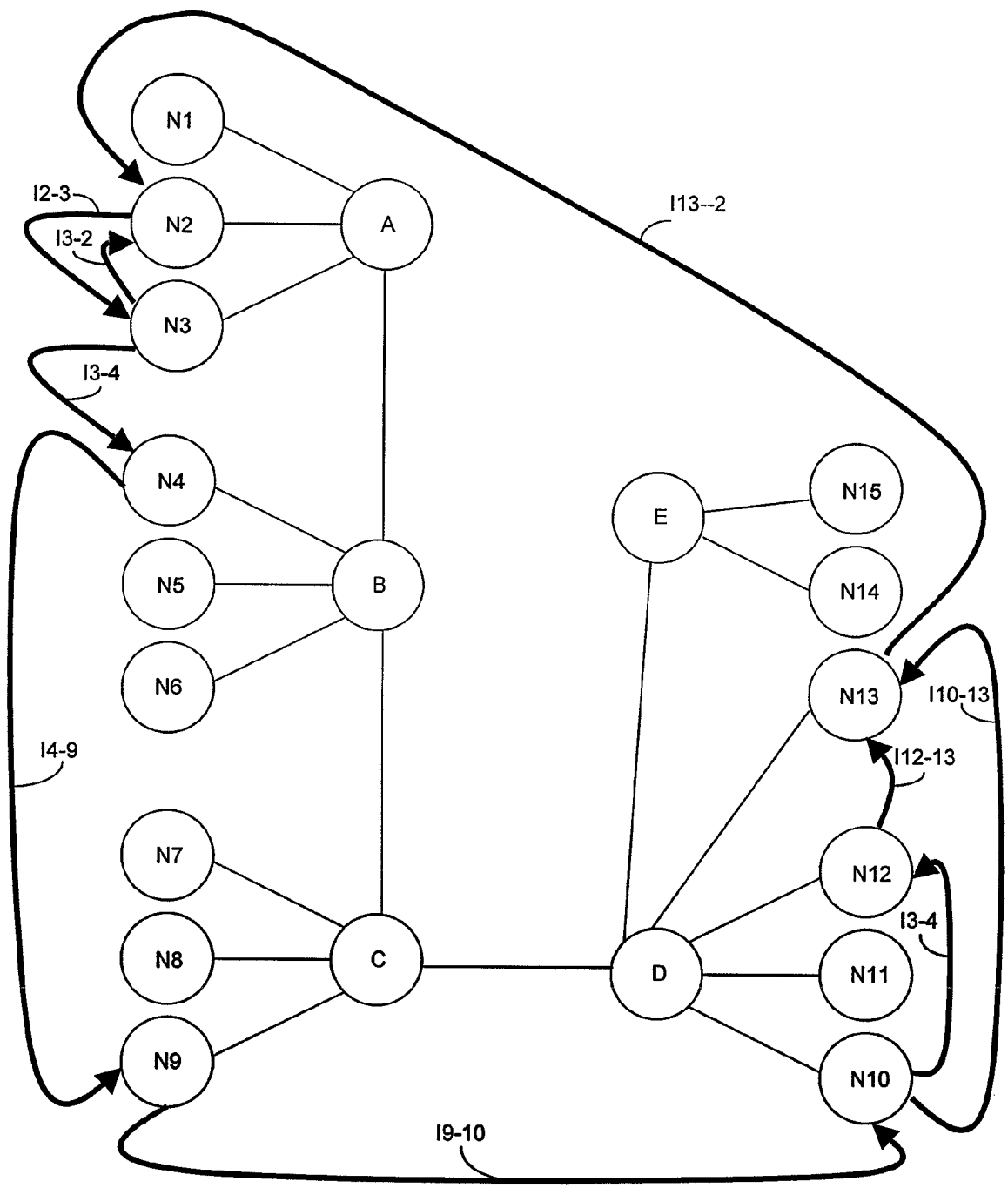
FIG. 6 is a block diagram illustrating another example network containing cooperating and non-cooperating nodes.

Referring to FIG. 6, a modification to the example of FIG. 1 is made so that node 13 has information about node N2, instead of node N12, as shown by arrow I13-2. This change makes the graph more completely connected, so that a path in the direction of the arrows can be drawn between all of the cooperating nodes N2, N3, N4, N9, N10, N12, and N13.

Referring to FIG. 7, the example of the network of FIG. 6 is used to demonstrate the method of FIG. 4. Initially, in this example, node N2 has information about itself (N2) and N3. Node N3 has information about itself (N3) and nodes N2 and N4. Node N4 has information about itself (N4) and node N9. Node N9 has information about itself (N9) and node N10. Node N10 has information about itself (N10) and nodes N12 and N13. Node N12 has information about itself (N12) and node N13. Node N13 has information about itself (N13) and node N2.

Round 1. In the first round, each node chooses (STEP 20) a node about which it has information (not including itself). The node that is chosen is shown in the second line as the "ROUND 1 PICK." In this example, in the first round, node N2 chooses node N3, node N3 chooses node N2, node N4 chooses node N9, node N9 chooses node N10, node N10 chooses node N12, node N12 chooses node N13, and node N13 chooses node N2. Each node receives information from its chosen node. (STEP 24). In this example, node N2 requests and receives information from node N3, its chosen node. Node N3 communicates information about nodes N2, N3, and N4 to node N2. Node N3 requests and receives information from node N2, its chosen node. Node N2 communicates information about nodes N2 and N3 to node N3. Node N4 requests and receives information from node N9, its chosen node. Node N9 communicates information about nodes N9 and N10 to node N4. Node N9 requests and receives information from node N10, its chosen node. Node 10 communicates information about nodes N10, N12, and N13 to node N9. Node N10 requests and receives information from node N12, its chosen node. Node 12 communicates information about nodes N12 and N13 to node N10. Node N12 requests and receives information from node N13, its chosen node. Node 13 communicates information about nodes N12 and N13 to node N12. Node N13 requests and receives information from node N2, its chosen node. Node 2 communicates information about nodes N2 and N3 to node N13.

Each node receives the information that is transmitted to it (STEP 24) and adds or merges the information that it receives with the information that it has (STEP 25). Thus, after the completion of Round 1, node N2 has information about nodes N2, N3, and N4. Node N3 has information about nodes N2, N3, and N4. Node N4 has information about nodes N4, N9, and N10. Node N9 has information about nodes N9, N10, N12, and N13. Node N10 has information about node N10, N12, and N13. Node N12 has information about nodes N2, N12, and N13. Node N13 has information about nodes N2, N3, and N13.

As in earlier examples, it should be noted that, for demonstrative purposes, in each node communicates with another node during the same time interval, so that information that is received by a node is not passed on until the next round, but this is not a requirement.

Round 2. In the second round, each node chooses (STEP 20) a node about which it has information (not including itself). The node that is chosen is shown in the fourth line as the "ROUND 2 PICK." In the second round, node N2 chooses node N3, node N3 chooses node N4, node N4 chooses node N9, node N9 chooses node N12, node N10 chooses node N13, node N12 chooses node N13, and node N13 chooses node N3. Each node receives cooperating node information from the chosen node from the previous round.

Node N2 receives information from node N3, its chosen node. Node N3 communicates its information about nodes N2, N3, and N4 to node N2. Node N3 receives information from node N4, its chosen node. Node N4 communicates its information about nodes N4, N9, and N10 to node N3. Node N4 receives information from node N9, its chosen node. Node N9 communicates its information about nodes N9, N10, N12, and N13 to node N4. Node N9 receives information from node N12, its chosen node. Node N12 communicates its information about nodes N2, N12, and N13 to node N9. Node N10 receives information from node N13, its chosen node. Node N13 communicates its information about nodes N2, N12, and N13 to node N10. Node N12 receives information from node N13, its chosen node. Node 13 communicates its information about nodes N2, N3, and N13 to node N12. Node N13 receives information from node N3, its chosen node. Node 3 communicates its information about nodes N2, N3, and N4 to node N13.

Each node receives the information that is transmitted to it (STEP 24) and adds or merges the information that it receives with the information that it has (STEP 25). Thus, after the completion of Round 2, node N2 has information about nodes N2, N3, and N4. Node N3 has information about nodes N2, N3, N4, N9, and N10. Node N4 has information about nodes N4, N9, N10, N12, and N13. Node N9 has information about nodes N9, N10, N12, and N13. Node N10 has information about nodes N2, N3, N10, N12, and N13. Node N12 has information about nodes N2, N3, N12, and N13. Node N13 has information about nodes N2, N3, N4, and N13.

Round 3. Each node chooses (STEP 20) a node about which it has information (not including itself). The node that is chosen is shown in the sixth line as the "ROUND 3 PICK." In the third round, node N2 chooses node N4, node N3 chooses node N10, node N4 chooses node N12, node N9 chooses node N10, node N10 chooses node N2, node N12 chooses node N3, and node N13 chooses node N4. Each node receives cooperating node information from the chosen node.

Node N2 receives information from node N4, its chosen node. Node N4 communicates its information about nodes N4, N9, N10, N12, and N13 to node N2. Node N3 receives information from node N10, its chosen node. Node N10 communicates its information about nodes N2, N3, N10, N12, and N13 to node N3. Node N4 receives information from node N12, its chosen node. Node N12 communicates its information about nodes N2, N3, N12, and N13 to node N4. Node N9 receives information from node N10, its chosen node. Node N10 communicates its information about nodes N2, N3, N10, N12, and N13 to node N9. Node N10 receives information from node N2, its chosen node. Node 2 communicates its information about nodes N2, N3, and N4 to node N10. Node N12 receives information from node N3, its chosen node. Node N3 communicates its information about nodes N2, N3, N4, N9, and N10 to node N12. Node N13 receives information from node N4, its chosen node. Node N4 communicates its information about nodes N4, N9, N10, N12, and N13 to node N13.

Each node receives the information that is transmitted to it (STEP 24) and adds or merges the information that it receives with the information that it has (STEP 25). Thus, after the completion of Round 3, the receiving nodes have the following information. Nodes N2, N3, N4, N4, N12, and N13, have information about all of the cooperating nodes. Node N9 has information about nodes N2, N3, N9, N10, N12 and N13. Node N10 has information about nodes N2, N3, N4, N10, N12, and N13.

Round 4. Each node chooses (STEP 20) a node about which it has information (not including itself). The node that is chosen is shown in the eighth line as the "ROUND 4 PICK." In the fourth round, node N2 chooses node N3, node N3 chooses node N4, node N4 chooses node N9, node N9 chooses node N2, node N10 chooses node N3, node N12 chooses node N10 and node N13 chooses node N12. Each node receives cooperating node information from the chosen node.

Node N2 receives information from node N3, its chosen node. Node N3 communicates its information about all cooperating nodes to node N2. Node N3 receives information from node N4, its chosen node. Node N4 communicates its information about all cooperating nodes to node N3. Node N4 receives information from node N9, its chosen node. Node N9 communicates its information about all cooperating nodes to node N4. Node N9 receives information from node N2, its chosen node. Node N2 communicates its information about all cooperating nodes to node N4. Node N1 receives information from node N3, its chosen node. Node N3 communicates its information about all cooperating nodes to node N4. Node N12 receives information from node N10, its chosen node. Node N10 communicates its information about nodes N2, N3, N4, N10, N12, and N13 to node N12. Node N13 receives information from node N12, its chosen node. Node N12 communicates its information about all cooperating nodes to node N4.

Each node receives the information that is transmitted to it (STEP 24) and adds or merges the information that it receives with the information that it has (STEP 25). Thus, after the completion of Round 4, all nodes have information about all other cooperating nodes. As can be seen from this example, when the graph of FIG. 6 is relatively more connected, the method of FIG. 4 is able to complete.

Figure 8:
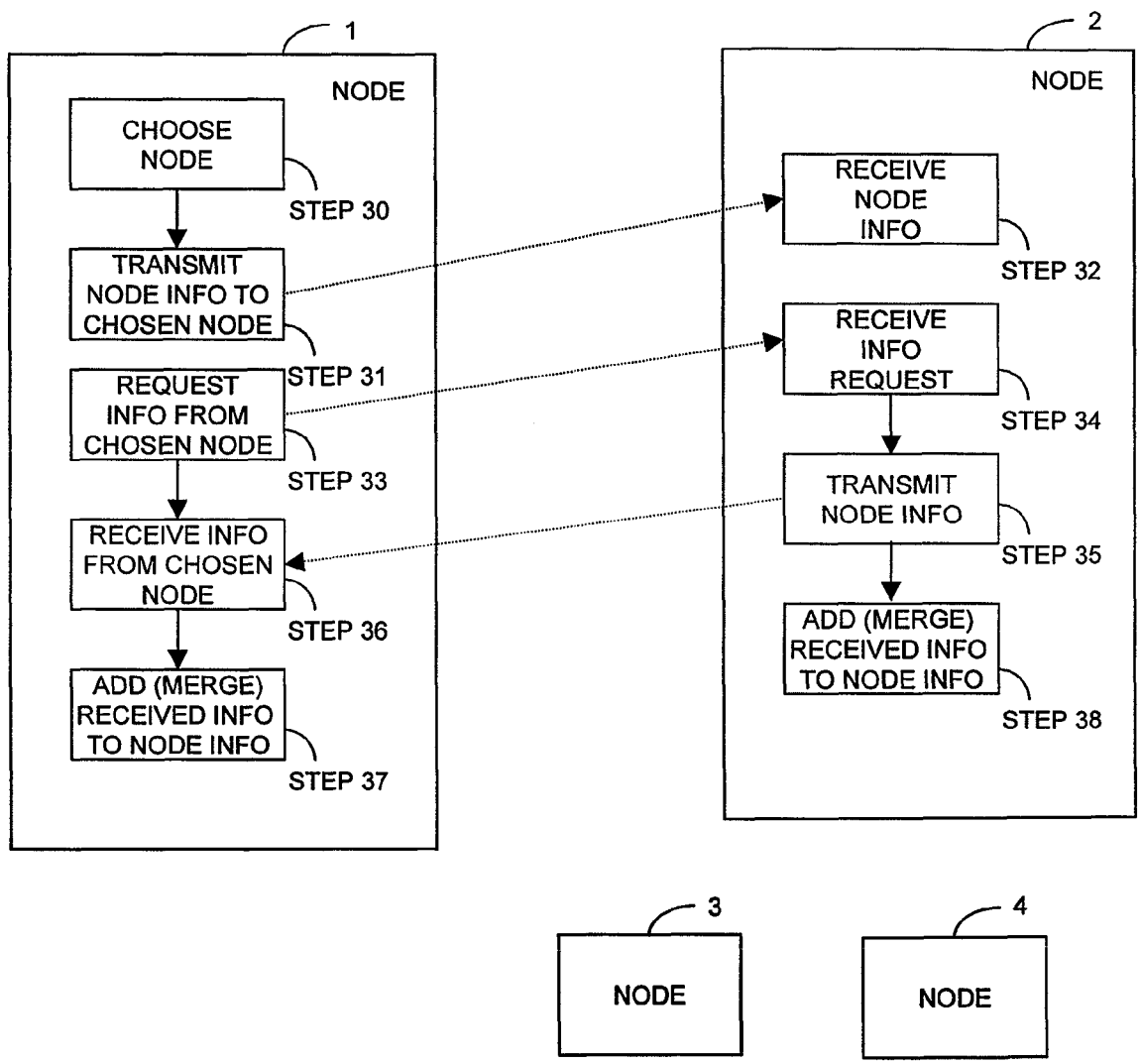
FIG. 8 is a block diagram of another embodiment of a method for resource discovery according to the invention.

Referring to FIG. 8, in another embodiment of a resource discovery method that combines the methods of FIG. 2 and FIG. 4, the cooperating nodes share or exchange information with each other in each round. In one embodiment, the first node 1 and the second node 2 exchange information by each transmitting and receiving information to and from the other node. After each node communicates information to the other node, and each node adds or merges the received information into its own store of cooperating node information.

In one embodiment, the first node 1 transmits information to the second node 2, and the first node 1 requests and receives node information from the second node 2. The information received by the first node 1 is added to the first node's node information. The information received by the second node 2 is added to the node information kept by the second node 2.

In one embodiment, the node information received by the second node 2 includes only information about the first node 1. In this embodiment, if the second node 2 does not have information about the first node 1, the second node can choose and communicate with the first node 1, and receive the node information that the first node 1 has. This change to the method of FIG. 4 helps the system to complete in less-well-connected networks. In another embodiment, the first node 1 transmits all of its cooperating node information to the second node 2, so that there is a complete exchange of cooperating node information. In another embodiment, whichever node receives the information first only transmits the cooperating node information that was not communicated to it. These variations have tradeoffs of computational and communication complexity.

Referring to FIG. 8, in one embodiment, the first node selects a node (STEP 30). The first node 1 transmits cooperating node information to the chosen node (STEP 31). The information is received by the chosen node (STEP 32). Sometime after the information is received by the chosen node (STEP 32), the chosen node merges the received information with its cooperating node information (STEP 38). The first node also requests information from the chosen node (STEP 33). The request can be a specific request, or the transmission of node information (STEP 31) could include or be the request. The chosen node 2 receives the request (STEP 34), and the chosen node transmits its node information to the first node 1 (STEP 35). The first node 1 receives the cooperating node information (STEP 36) and merges the received information with its cooperating node information (STEP 37). These steps are repeated by the first node 1, and by each of the cooperating nodes, as described above. The order of the transmission and reception steps can be reversed as shown in FIG. 10, and the merging step can take place any time during or after the cooperating node information is received by a node.

Figure 9:
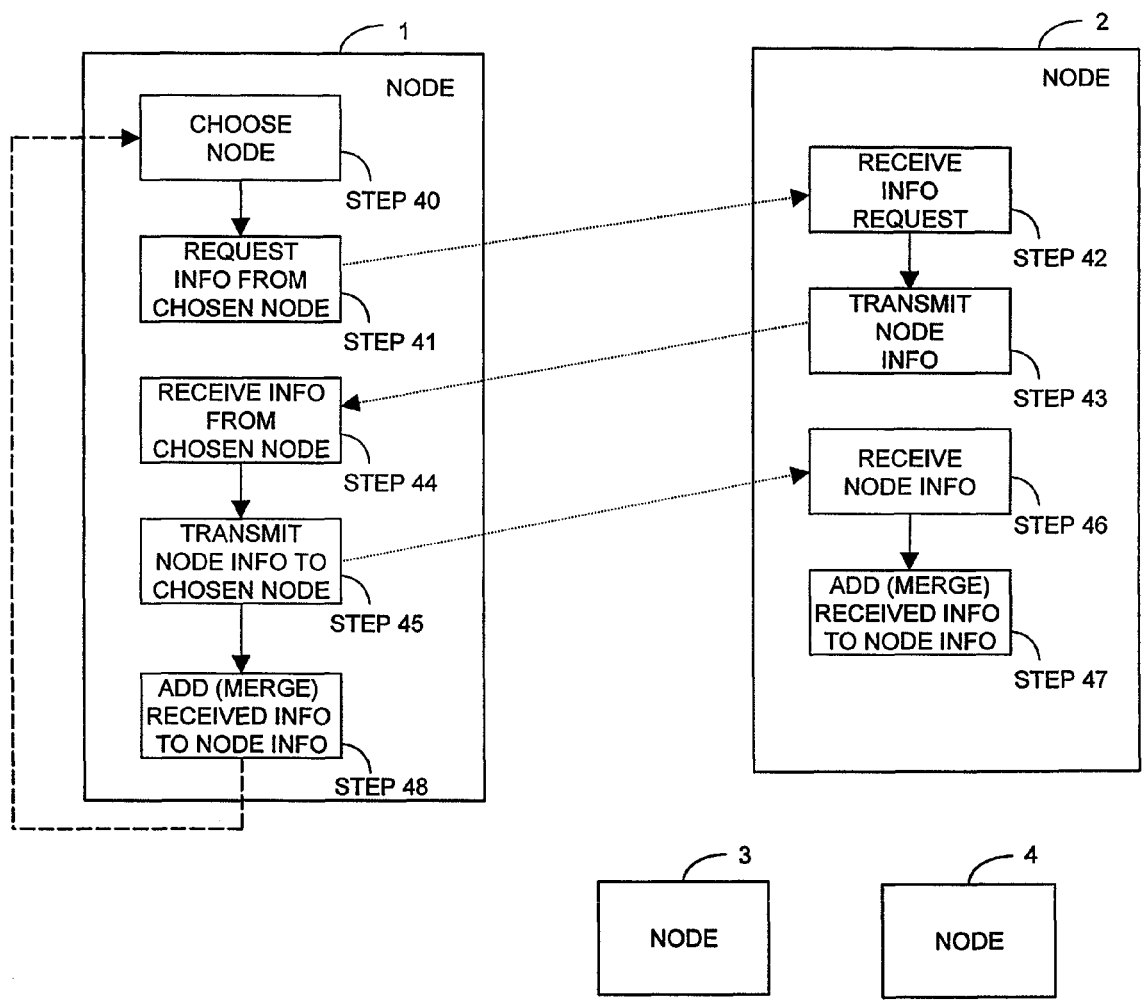
FIG. 9 is a block diagram of another embodiment of the method of FIG. 8 in which the order of communication between nodes is modified.

Referring to FIG. 9, a variation of the method of FIG. 8 is shown in which the first node 1 first requests cooperating node information from the chosen node (STEP 41). The chosen node 2 receives the request (STEP 42) and responds by transmitted the requested cooperating node information (STEP 43). The node 1 receives the information (STEP 44). The node 1 also communicates its cooperating node information to the chosen node (STEP 45), and the cooperating node information is received by the chosen node (STEP 46). Both nodes 2, 1 merge the received information into their cooperating node information (STEP 47, STEP 48). The order in which the method steps take place is not intended to be a limitation of the scope of the invention. In other embodiments, the merging steps (STEP 47, STEP 48) can take place at other times. For example, for the first node 1, the merging step (STEP 48) can take place before, after, or during the transmitting step (STEP 45).

Referring to FIG. 10, the network of FIG. 1 is used to demonstrate the method of FIG. 9. In this method, each node selects a cooperating nodes a node about which it has information, and requests and receives all cooperation information node information from the chosen node, and transmits its cooperating node information about all known cooperating nodes.

In this example, as in the example of FIG. 3, and as shown on the first line of the table of FIG. 10, node N2 has information about itself (N2) and N3. Node N3 has information about itself (N3) and nodes N2 and N4. Node N4 has information about itself (N4) and node N9. Node N9 has information about itself (N9) and node N10. Node N10 has information about itself and nodes N12 and N13. Node N12 has information about itself and node N13. Node N13 has information about itself (N13) and node N12.

Round 1. In the first round, each node chooses (STEP 40) a node about which it has information (not including itself). The node that is chosen is shown in the second line as the "ROUND 1 PICK." In this example, in the first round, node N2 chooses node N3, node N3 chooses node N2, node N4 chooses node N9, node N9 chooses node N10, node N10 chooses node N12, node N12 chooses node N13, and node N13 chooses node N12.

Node N2 exchanges information with node N3, its chosen node, by first requesting cooperating node information (STEP 41), and then transmitting its cooperating node information (STEP 45). Node N3 communicates its information about nodes N2, N3, and N4 to node N2 (STEP 43). Node N2 communicates its information about nodes N2 and N3 to node N3 (STEP 45). Node N3 exchanges information with node N2, its chosen node. Node N2 communicates its information about nodes N2 and N3 to node N3. Node N3 communicates its information about nodes N2, N3 and N4 to node N2. Node N4 exchanges information with N9, its chosen node. Node N9 communicates information about nodes N9 and N10 to node N4. Node N4 communicates information about nodes N4 and N9 to node N9. Node N9 exchanges information from node 10, its chosen node. Node N10 communicates information about nodes N10, N12, and N13 to node N9. Node N9 communicates information about nodes N9 and N10 to node N10. Node N10 exchanges information with node N12, its chosen node. Node N12 communicates information about nodes N12 and N13 to node N10. Node N10 communicates information about nodes N10, N12, and N13 to node N12. Node N12 exchanges information from node 13, its chosen node. Node N13 communicates information about nodes N12 and N13 to node N12. Node N12 communicates information about nodes N12 and N13 to node N13. Node N13 exchanges information from node N12, its chosen node. Node N12 communicates information about nodes N12 and N13 to node N13. Node N13 communicates information about nodes N12 and N13 to node N12.

Each node receives the information that is transmitted to it (STEP 44, STEP 46) and adds or merges the information that it receives with the information that it has (STEP 47, STEP 48). Thus, after the completion of Round 1, the receiving nodes have the following information. Node N2 has information about nodes N2, N3, and N4. Node N3 has information about nodes N2, N3, and N4. Node N4 has information about nodes N4, N9, and N10. Node N9 has information about nodes N4, N9, N10, N12, and N13. Node N10 has information about nodes N9, N10, N12, and N13. Node N12 has information about nodes N10, N12, and N13. Node N13 has information about nodes N12 and N13.

As shown in this example, the merging of information takes place after the nodes exchange information. This is not a requirement, and the merging of information can take place any time during or after the information to be merged is communicated, even while other information is being received. As in the other examples, method steps are shown as performed in a specific order for demonstrative purposes.

Round 2. In the second round, each node chooses a node about which it has information (not including itself). The node that is chosen is shown in the second fourth line as the "ROUND 2 PICK." In the second round, node N2 chooses node N3, node N3 chooses node N4, node N4 chooses node N9, node N9 chooses node N4, node N10 chooses node N13, node N12 chooses node N10, and node N13 chooses node N12.

Node N2 exchanges information with node N3, its chosen node. Node N3 communicates its information about nodes N2, N3, and N4 to node N2. Node N2 communicates its information about nodes N2, N3, and N4 to node N3. Node N3 exchanges information with node N4, its chosen node. Node N4 communicates its information about nodes N4, N9, and N10 to node N3. Node N3 communicates its information about nodes N2, N3, and N4 to node N4. Node N4 exchanges information with node N9, its chosen node. Node N9 communicates information about nodes N4, N9, N10, N12, and N13 to node N4. Node N4 communicates information about nodes N4, N9, and N10 to node N9. Node N9 exchanges information with N4, its chosen node. Node N4 communicates information about nodes N4, N9, and N10 to node N9. Node N9 communicates information about nodes N4, N9, N10, N12 and N13 to node N9. Node N10 exchanges information with node N13, its chosen node. Node N13 communicates information about nodes N12 and N13 to node N10. Node N10 communicates information about nodes N9, N10, N12, and N13 to node N13. Node N12 exchanges information with node 10, its chosen node. Node N10 communicates information about nodes N9, N10, N12, and N13 to node N12. Node N12 communicates information about nodes N10, N12, and N13 to node N10. Node N13 exchanges information from node N12, its chosen node. Node N12 communicates information about nodes N10, N12, and N13 to node N12. Node N13 communicates information about nodes N12 and N13 to node N12.

Each node receives the information that is communicated to it (STEP 44, STEP 46) and adds or merges the information that it receives with the information that it has (STEP 47, STEP 48). Thus, after the completion of Round 2, the receiving nodes have the following information. Node N2 has information about nodes N2, N3, and N4. Node N3 has information about nodes N2, N3, N4, N9, and N10. Node N4 has information about all cooperating nodes. Node N9 has information about nodes N4, N9, N10, N12, and N13. Node N10 has information about node N9, N10, N12, and N13. Node N12 has information about nodes N9, N10, N12, and N13. Node N13 has information about nodes N9, N10, N12, and N13.

Round 3. Each node chooses (STEP 40) a node about which it has information (not including itself). The node that is chosen is shown in the sixth line as the "ROUND 3 PICK." In the third round, node N2 chooses node N4, node N3 chooses node N10, node N4 chooses node N9, node N9 chooses node N10, node N10 chooses node N12, node N12 chooses node N13, and node N13 chooses node N10.

Node N2 exchanges information with node N4, its chosen node. Node N4 communicates its information about all cooperating nodes to node N2. Node N2 communicates its information about nodes N2, N3, and N4 to node N4. Node N3 exchanges information with node N10, its chosen node. Node N10 communicates its information about nodes N9, N10, N12, and N13 to node N3. Node N3 communicates its information about nodes N2, N3, N4, N9, and N10 to node N10. Node N4 exchanges information with node N9, its chosen node. Node N9 communicates information about nodes N4, N9, N10, N12, and N13 to node N4. Node N4 communicates information about all cooperating nodes to node N9. Node N9 exchanges information with node N10, its chosen node. Node N10 communicates information about nodes N9, N10, N12, and N13 to node N9. Node N9 communicates information about nodes N4, N9, N10, N12 and N13 to node N10. Node N10 exchanges information from node N12, its chosen node. Node N12 communicates information about nodes N9, N10, N12, and N13 to node N10. Node N10 communicates information about nodes N9, N10, N12, and N13 to node N12. Node N12 exchanges information with node N13, its chosen node. Node N13 communicates information about nodes N9, N10, N12, and N13 to node N12. Node N12 communicates information about nodes N9, N10, N12, and N13 to node N13. Node N13 exchanges information with node N10, its chosen node. Node N10 communicates information about nodes N9, N10, N12, and N13 to node N13. Node N13 communicates information about nodes N9, N10, N12, and N13 to node N10.

Each node receives the information that is transmitted to it (STEP 44, STEP 46) and adds or merges the information that it receives with the information that it has (STEP 47, STEP 48). Thus, after the completion of Round 3, node N2 has information about all cooperating nodes. Node N3 has information about all cooperating nodes. Node N4 has information about all cooperating nodes. Node N9 has information about all cooperating nodes. Node N10 has information about nodes N4, N9, N10, N12, and N13. Node N12 has information about nodes N9, N10, N12, and N13. Node N13 has information about nodes N9, N10, N12, and N13.

Round 4. Each node chooses (STEP 40) a node about which it has information (not including itself). The node that is chosen is shown in the eighth line as the "ROUND 4 PICK." In the fourth round, node N2 chooses node N3, node N3 chooses node N4, node N4 chooses node N9, node N9 chooses node N2, node N10 chooses node N4, node N12 chooses node N10, and node N13 chooses node N12.

Node N2 exchanges information with node N3, its chosen node. Node N3 communicates its information about all cooperating nodes to node N2. Node N2 communicates its information about all cooperating nodes to node N3. Node N3 exchanges information with node N4, its chosen node. Node N4 communicates its information about all cooperating nodes to node N3. Node N3 communicates its information about all cooperating nodes to node N4. Node N4 exchanges information with node N9, its chosen node. Node N9 communicates its information about all cooperating nodes to node N4. Node N4 communicates its information about all cooperating nodes to node N9. Node N9 exchanges information with node N2, its chosen node. Node N2 communicates its information about all cooperating nodes to node N9. Node N9 communicates its information about all cooperating nodes to node N2. Node N10 exchanges information with node N4, its chosen node. Node N4 communicates its information about all cooperating nodes to node N10. Node N10 communicates its information about nodes N4, N9, N10, N12, and N13 to node N3. Node N12 exchanges information with node N10, its chosen node. Node N10 communicates its information about nodes N4, N9, N10, N12, and N13 to node N12. Node N12 communicates its information about nodes N9, N10, N12, and N13 to node N10. Node N13 exchanges information with node N12, its chosen node. Node N12 communicates its information about nodes N9, N10, N12, and N13 to node N13. Node N13 communicates its information about nodes N9, N10, N12, and N13 to node N12.

Each node receives the information that is transmitted to it (STEP 44, STEP 46) and adds or merges the information that it receives with the information that it has (STEP 47, STEP 48). Thus, after the completion of Round 4, the receiving nodes have the following information. Node N2, N3, N9, and N10 each has information about all cooperating nodes. Node N12 has information about nodes N4, N9, N10, N12, and N13. Node N13 has information about nodes N9, N10, N12, and N13.

Round 5. Each node chooses (STEP 40) a node about which it has information (not including itself). The node that is chosen is shown in the tenth line as the "ROUND 5 PICK." In the fifth round, node N2 chooses node N9, node N3 chooses node N12, node N4 chooses node N3, node N9 chooses node N13, node N10 chooses node N2, node N12 chooses node N13, and node N13 chooses node N10.

Node N2 exchanges information with node N9, its chosen node. Node N9 communicates its information about all cooperating nodes to node N2. Node N2 communicates its information about all cooperating nodes to node N9. Node N3 exchanges information with node N12, its chosen node. Node N12 communicates its information about nodes N4, N9, N10, N12, and N13 to node N3. Node N3 communicates its information about all cooperating nodes to node N12. Node N4 exchanges information with node N3, its chosen node. Node N3 communicates its information about all cooperating nodes to node N4. Node N4 communicates its information about all cooperating nodes to node N3. Node N9 exchanges information with node N13, its chosen node. Node N13 communicates its information about nodes N9, N10, N12, and N13 to node N9. Node N9 communicates its information about all cooperating nodes to node N13. Node N10 exchanges information with node N2, its chosen node. Node N2 communicates its information about all cooperating nodes to node N10. Node N10 communicates its information about all cooperating nodes to node N2. Node N12 exchanges information with node N13, its chosen node. Node N13 communicates its information about nodes N4, N9, N10, N12, and N13 to node N12. Node N12 communicates its information about nodes N4, N9, N10, N12, and N13 to node N13. Node N13 exchanges information with node N10, its chosen node. Node N10 communicates its information about all cooperating nodes to node N13. Node N13 communicates its information about all cooperating nodes to node N10.

Each node receives the information that is transmitted to it (STEP 44, STEP 46) and adds or merges the information that it receives with the information that it has (STEP 47, STEP 48). Thus, after the completion of Round 5, all nodes have information about all other cooperating nodes.

In one embodiment, the node information is merged before transmitting to the other node. In another embodiment, the request is followed by the transmission by the first node 1 to the second node 2, so that the exchange of node information occurs relatively simultaneously. In another embodiment, in an exchange, a receiving node does not send information about the node it just received information about. This will save communications resources at the expense of some additional processing. In yet another embodiment, a node does not communicate information about the node it is communicating with. Again, this will save some communications resources at the expense of some additional processing.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for discovery of cooperating nodes in a network of nodes in which each cooperating node has information about at least one other cooperating node, comprising the steps of:

(a) performing, by each cooperating node, the sub-steps of:
  (a1) selecting, from its cooperating node information, only one second cooperating node; and
  (a2) transmitting to the second cooperating node, or receiving therefrom, at least a portion of the available cooperating node information; and
(b) repeating, at an interval, steps (a), (a1), and (a2).

2. The method of claim 1, wherein the interval is consistent.

3. The method of claim 1, wherein the interval changes over time.

4. The method of claim 1, wherein sub-step (a1) comprises randomly selecting the second cooperating node.

5. The method of claim 1, wherein sub-step (a1) comprises pseudo-randomly selecting the second cooperating node.

6. The method of claim 1, wherein sub-step (a1) comprises selecting the second cooperating node from an ordered list.

7. The method of claim 1, wherein the portion of the available cooperating node information that is transmitted or received in sub-step (a2) comprises a list of cooperating nodes and resources available thereat.

8. A method for discovery of cooperating nodes in a network of nodes in which each cooperating node has information about at least one other cooperating node, comprising the steps of:
  (a) selecting, by a first cooperating node from its cooperating node information, only one second cooperating node;
  (b) receiving information at the first cooperating node transmitted from the second cooperating node, the information being at least a portion of the cooperating node information available to the second cooperating node and being transmitted following receipt, at the second cooperating node, of a request for the information issued by the first cooperating node; and
  (c) repeating, at an interval, steps (a) and (b).

9. The method of claim 8, wherein step (a) comprises randomly selecting the second cooperating node.

10. The method of claim 8, wherein step (a) comprises pseudo-randomly selecting the second cooperating node.

11. The method of claim 8, wherein step (a) comprises selecting the second cooperating node from an ordered list.

12. The method of claim 8, wherein the portion of the cooperating node information received in step (b) comprises a list of cooperating nodes and resources available thereat.

13. The method of claim 8, wherein the portion of the cooperating node information received in step (b) comprises all of the second cooperating node's cooperating node information.

14. The method of claim 8 further comprising repeating, at the interval, steps (a) and (b) by each of the cooperating nodes.

15. The method of claim 8 further comprising merging, by the first cooperating node, the portion of the cooperating node information received in step (b) with cooperating node information previously available to the first cooperating node.

16. The method of claim 8 further comprising transmitting, from the first cooperating node to the second cooperating node, at least a portion of the cooperating node information available to the first cooperating node.

17. The method of claim 16 further comprising merging, by the second cooperating node, the portion of the cooperating node information transmitted by the first cooperating node with cooperating node information previously available to the second cooperating node.

18. A first cooperating node for discovering information about other cooperating nodes in a system of cooperating nodes, the first cooperating node comprising:
  a selector for selecting, from cooperating node information available to the first cooperating node, only one second cooperating node;
  a transceiver for transmitting to the second cooperating node, or for receiving therefrom, at least a portion of available cooperating node information; and
  a timer control for triggering, at an interval, the selector and the transceiver.

19. The first cooperating node of claim 18, wherein the interval is at least one of consistent or changed over time.

20. The first cooperating node of claim 18, wherein the second cooperating node is selected in at least one of a random manner, a pseudo-random manner, or from an ordered list.

* * * * *